United States Patent
Sturm et al.

(10) Patent No.: US 8,861,415 B2
(45) Date of Patent: Oct. 14, 2014

(54) DATA TRANSMISSION DEVICE AND A METHOD FOR ACTIVATING A DATA TRANSMISSION

(75) Inventors: Roland Sturm, Erlangen (DE); Heinrich Milosiu, Erlangen (DE); Artur Grillborzer, Nuremberg (DE); Volker Gehrmann, Erlangen (DE); Martin Tittel, Forchheim (DE); Juergen Hupp, Nuremberg (DE); Christian Fluegel, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 327 days.

(21) Appl. No.: 13/481,492

(22) Filed: May 25, 2012

(65) Prior Publication Data
US 2012/0320809 A1   Dec. 20, 2012

Related U.S. Application Data

(63) Continuation of application No. PCT/EP2010/068323, filed on Nov. 26, 2010.

(30) Foreign Application Priority Data

Nov. 26, 2009   (DE) .......................... 10 2009 047 199

(51) Int. Cl.
*G08C 17/00* (2006.01)
*H04W 52/02* (2009.01)

(52) U.S. Cl.
CPC ................................ *H04W 52/0235* (2013.01)
USPC ........... 370/311; 370/352; 370/389; 370/431; 370/509

(58) Field of Classification Search
CPC ................................................. H04W 52/0235
USPC .......... 370/311, 352, 389, 431, 465, 470, 509
See application file for complete search history.

(56) References Cited

U.S. PATENT DOCUMENTS

| 6,690,655 | B1 | 2/2004 | Miner |
| 6,785,564 | B1 * | 8/2004 | Quigley et al. ............... 455/574 |

(Continued)

FOREIGN PATENT DOCUMENTS

| DE | 101 39 779 | 6/2003 |
| DE | 102 01 415 | 12/2004 |

(Continued)

OTHER PUBLICATIONS

Anastasi, G et al: "Extending the Lifetime of Wireless Sensor Networks Through Adaptive Sleep", IEEE Transactions on Industrial Informatics, IEEE Service Center, New York, Bd. 5, Nr. 3 (Aug. 1, 2009) pp. 351-365, XP011271718.

*Primary Examiner* — Andrew Lai
*Assistant Examiner* — Andrew C Lee
(74) *Attorney, Agent, or Firm* — Michael A. Glenn; Perkins Coie LLP

(57) ABSTRACT

A data transmission device has a data transmitter and a wake-up receiver. The data transmitter is activable to change from an idle state into an operating state and to execute a data transmission with a communication partner in the operating state. The wake-up receiver is implemented to be ready to receive an initiation signal during the idle state of the data transmitter and to activate the data transmitter in response to the initiation signal. The wake-up receiver is further implemented to extract data transmission information from the initiation signal to determine a time for activating the data transmitter depending on the data transmission information or to activate the data transmitter such that the data transmitter executes the data transmission depending on the data transmission information.

16 Claims, 8 Drawing Sheets

(56) References Cited

U.S. PATENT DOCUMENTS

| | | |
|---|---|---|
| 7,079,572 B2 | 7/2006 | Heise |
| 7,139,310 B2 | 11/2006 | Heise |
| 8,687,658 B2 * | 4/2014 | Anderson et al. ............. 370/509 |
| 2002/0061012 A1 * | 5/2002 | Thi et al. ...................... 370/352 |
| 2004/0090962 A1 * | 5/2004 | Forest et al. .................. 370/392 |
| 2005/0262368 A1 * | 11/2005 | Cherukuri et al. ............ 713/324 |
| 2008/0008172 A1 * | 1/2008 | Kobayashi .................... 370/389 |
| 2008/0077814 A1 * | 3/2008 | Cherukuri et al. ............ 713/320 |
| 2009/0129306 A1 | 5/2009 | Twitchell |
| 2009/0323722 A1 * | 12/2009 | Sharma ........................ 370/470 |

FOREIGN PATENT DOCUMENTS

| | | |
|---|---|---|
| GB | 2 415 573 | 12/2005 |
| GB | 2 455 771 | 6/2009 |
| WO | WO 03/098851 | 11/2003 |

* cited by examiner

DATA TRANSMISSION DEVICE AND A METHOD FOR ACTIVATING A DATA TRANSMISSION

CROSS-REFERENCE TO RELATED APPLICATIONS

This application is a continuation of copending International Application No. PCT/EP2010/068323, filed Nov. 26, 2010, which is incorporated herein by reference in its entirety, and additionally claims priority from German Application No. DE 10 2009047199.5, filed Nov. 26, 2009, which is also incorporated herein by reference in its entirety.

BACKGROUND OF THE INVENTION

The present invention relates to a data transmission device, a data transmission system and a method for activating a data transmission and, in particular, to a device and a method of a wake-up signaling and a simultaneous network setup.

In order for several participants (e.g. radio nodes) to be able to transmit data via a network, it is, for example, standard practice to use a time-controlled media access method. Network protocols for wireless networks in this respect frequently use TDMA methods (TDMA=time division multiple access). The radio nodes of such networks contain standard transceiver units. In TDMA methods, the transceivers are only activated at certain points in time and only for a short time. During this time, the communication is executed. Thereafter, the transceiver is switched off again (idle state or idle phase or sleep time). Thus, in particular the receiver is not active most of the time and thus not reachable for a radio communication (latency). In order to save current, the TDMA method is frequently operated with a low duty cycle, wherein the duty cycle defines, for example, the percentage of an overall period in which the transmission means transmits data. In this scenario, thus an increase in the reaction time or an unwantedly long latency results. An event may only be detected and passed on in the next receive time. In order to be able to acquire operation times in the order of years with small batteries (e.g. button cells), such a receiver of a standard transceiver generally has to be switched off for minutes (this also depends on the battery used) in order to then be able to be switched on again only for a short time. The duty cycle thus has to be very short.

Current-saving receivers (e.g. wake-up receivers) are thus set up very simply and comprise a moderate sensitivity. The achievable power consumption is only in an order of magnitude of 100 microamperes, however. Thus, they are suitable for steady-state operation, but may generally not be used as a main receiver as their sensitivity is too low.

Wireless networks usually maintain their synchronicity by regular synchronization messages (e.g. so-called beacons). To regularly receive the same, switching on the receiver at the right time (in the TDMA method) is needed. With very long sleep times between the phases in which a data transmission may take place, drift effects may have a negative effect. Depending on the accuracy of the internal timers, the times drift apart and the next synchronization message may be missed. This may be prevented by making sleep times shorter, which is a disadvantage in terms of energy, but additional synchronization mechanisms may bring an improvement. One possibility is additional synchronization messages which only serve for synchronization but do not enable a data transmission. Likewise, drift effects may only be balanced by longer receive windows.

Wireless sensor networks usually use TDMA-based protocols. With very current-saving applications, sleep times are very long and thus also latency. Thus, a long time passes until an event may be reported across the network. With battery-supported applications with an operating life time above 1 year, latency may already be in the range of minutes. With systems having a wake-up receiver, the same generally only serves for activating the main system in case of an event, like, for example, an interrupt. After activating, a network setup is executed by a new synchronization.

From the above-mentioned, for the described access methods a series of problems result for the network. Thus, for example, current-saving synchronous wireless sensor networks generally operate with the TDMA method so that they are not ready to receive continuously, but only at discrete points in time. Due to the non-continuous capacity to receive, the energy consumption is reduced, on the other hand, however, an event may only be reported or transmitted at discrete times via the network. The resulting latencies are the longer, the lower said duty cycle. This is not acceptable for many applications.

A further problem results from the limited operation time with battery operation. If the desired operation time with battery operation, for example in particular with button cell operation, is set to more than a year, a maximum admissible current consumption of the used receiver of clearly less than, for example, 100 µA results. Such an average current consumption may only be acquired using standard transceivers and TDMA methods if the duty cycle is in a unary or one-digit percentage. This, again, involves the disadvantage of a very long latency.

A further problem results from the fact that with very long sleep times which may, for example, be in a range of several hours, drift effects may have a negative effect. These drift effects describe a diverging of the timers for the individual network nodes if they have not been synchronized over a long period of time (i.e. were not adapted). In order to compensate this, additional measures for synchronization would be needed or the network nodes would have to comprise a longer receive window. The additional measures may, for example, include additional signals which are transmitted across the network. In any case, thus the energy consumption would rise again. Thus, a compromise between the most efficient use of available energy possible and preventing drift effects is needed. This compromise limits the energy-saving potential considerably.

Finally, it is disadvantageous in standard technology that for receiving synchronization signals generally the main receiver is used, which again leads to an increased current or energy consumption.

SUMMARY

According to an embodiment, a data transmission device may have a data transmitter which may be activated to change from an idle state into an operating state and to execute a data transmission with a communication partner in the operating state, and a wake-up receiver which is implemented to be ready to receive for an initiation signal during the idle state of the data transmitter and to activate the data transmitter in response to the initiation signal, wherein the wake-up receiver is implemented to extract data transmission information from the initiation signal to determine a time for activating the data transmitter depending on the data transmission information or to activate the data transmitter such that the data transmitter executes the data transmission depending on the data transmission information, wherein the initiation signal is a first initiation signal and wherein the data transmission device is implemented to send out a second initiation signal in response to receiving the first initiation signal, wherein the first and the second initiation signals have information which report when synchronization signals are to be expected which are to be received by the data transmitter, wherein the data transmission device is implemented so that the information which include the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal.

According to another embodiment, a data transmission system may have a plurality of data transmission devices having a data transmitter which may be activated to change from an idle state into an operating state and to execute a data transmission with a communication partner in the operating state, and a wake-up receiver which is implemented to be ready to receive for an initiation signal during the idle state of the data transmitter and to activate the data transmitter in response to the initiation signal, wherein the wake-up receiver is implemented to extract data transmission information from the initiation signal to determine a time for activating the data transmitter depending on the data transmission information or to activate the data transmitter such that the data transmitter executes the data transmission depending on the data transmission information, wherein the initiation signal is a first initiation signal and wherein the data transmission device is implemented to send out a second initiation signal in response to receiving the first initiation signal, wherein the first and the second initiation signals include information which report when synchronization signals are to be expected which are to be received by the data transmitter, wherein the data transmission device is implemented so that the information which include the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal; and a master node which is implemented to control the activation of the data transmission.

According to another embodiment, a data transmission system may have a plurality of data transmission devices, each of them having a data transmitter which may be activated to change from an idle state into an operating state and to execute a data transmission with a communication partner in the operating state, and a wake-up receiver which is implemented to be ready to receive for a first initiation signal during the idle state of the data transmitter and to activate the data transmitter in response to the first initiation signal, wherein the wake-up receiver is implemented to extract data transmission information from the first initiation signal to determine a time for activating the data transmitter depending on the data transmission information or to activate the data transmitter such that the data transmitter executes the data transmission depending on the data transmission information, wherein the initiation signal is a first initiation signal and wherein the respective data transmission device is implemented to send out a second initiation signal in response to receiving the first initiation signal, wherein the first and second initiation signals include information which report when synchronization signals are to be expected which are to be received by the data transmitter, wherein the respective data transmission device is additionally implemented so that the information which include the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal, a plurality of sensors for detecting a sensor signal and sending out a second initiation signal based on the same, wherein the wake-up receiver of each data transmission device is further implemented to be ready to receive also for the second initiation signal during the idle state of the data transmitter and to activate the data transmitter in response to the second initiation signal such that the data transmitter sends out synchronization signals, wherein each data transmission device is additionally implemented to send out a first initiation signal upon receiving the second initiation signal.

According to another embodiment, a method for activating a data transmission may have the steps of receiving an initiation signal by a wake-up receiver during the idle state of a data transmitter; extracting data transmission information from the initiation signal; and activating a data transmitter in response to the initiation signal to change from the idle state into an operating state, to execute a data transmission with a communication partner in the operating state, wherein the data transmission information include a time for activating the data transmitter or the data transmitter is activated such that the data transmission may be executed depending on the data transmission information, wherein the initiation signal is a first initiation signal and wherein, in response to receiving the first initiation signal, a second initiation signal is sent out, wherein the first and second initiation signals include information which reports when synchronization signals are to be expected which are to be received by the data transmitter, wherein the information which includes the first and second initiation signal and reports when synchronization signals are to be expected are given in the form of a time span which passes until sending out the synchronization signals, and the first and second initiation signals deviate in so far as the time duration is considered which passes from receiving the first initiation signal until sending out the second initiation signal.

According to another embodiment, a computer program may have a program code for executing the method for activating a data transmission which may have the steps of receiving an initiation signal by a wake-up receiver during the idle state of a data transmitter; extracting data transmission information from the initiation signal; and activating a data transmitter in response to the initiation signal to change from the idle state into an operating state, to execute a data transmission with a communication partner in the operating state, wherein the data transmission information includes a time for activating the data transmitter or the data transmitter is activated such that the data transmission may be executed depending on the data transmission information, wherein the initiation signal is a first initiation signal and wherein, in response to receiving the first initiation signal, a second initiation signal is sent out, wherein the first and second initiation signals include information which reports when synchronization signals are to be expected which are to be received by the data transmitter, wherein the information which includes the first and second initiation signal and reports when synchronization signals are to be expected are given in the form of a time span which passes until sending out the synchronization signals, and the first and second initiation signals deviate in so far as the time duration is considered which passes from receiving the first initiation signal until sending out the second initiation signal, wherein the time of activating lies after a time duration after receiving the initiation signal and the activation is not executed until the time of activating, when the computer program is executed on a computer.

The present invention is based on the finding that an energy-intensive data transmission means may be set into an idle state from which it may be activated by means of a wake-up receiver into an operating state. The wake-up receiver is implemented, in response to an initiation signal (or wake-up signal), to activate the data transmission means from the idle state into the operating state. Here, the initiation signal is implemented such that it comprises additional information (data transmission information), for example to activate the data transmission means at a certain point in time, i.e. not until a data transmission may in fact take place. Alternatively, the data transmission means is initiated with specific network parameters or data transmission parameters contained in the initiation signal. Thus, embodiments of the present invention use the wake-up signal of the wake-up receiver to transmit additional information for the purpose of enabling the data transmission means to operate as efficiently as possible: e.g., it is not switched on until the point in time when either a synchronization takes place or a data transmission may start, wherein simultaneously network parameters may be passed on so that a time loss with respect to the network setup is minimized.

Wake-up signaling thus serves, for example, to activate a synchronous, wireless network operating with the TDMA method and a low duty cycle, on demand and with selectable transmission parameters. Due to the minimum latency, events may thus be transmitted quickly. The wake-up signaling further reduces, with previously non-synchronous networks, the energy consumption during the synchronization phase, because a waking up of the nodes does not have to be ready to receive from the wake-up time to the next synchronization message, but is informed, for example, when the synchronization message is sent, wherein the synchronization message may, for example, include the above-described beacon. Finally, by means of the wake-up signaling, transmission parameters may be reselected (i.e. changed), which may be adapted to the time performance of the protocol, e.g. to the data throughput to be expected.

Embodiments thus aim at the reduction of the energy consumption in the operation, for example, of wireless synchronous sensor networks and the reduction of latencies in data transmission. Sensor networks are thus especially interesting as, in particular for these networks, very long idle phases exist, from which networks are to set up very quickly in order to transmit a sensor event to a receiver without time loss. The sensor signal may, for example, include exceeding a sensor temperature or a response of a motion detector or an opening of a door or similar events.

According to further embodiments, each radio node (or generally network nodes) in this respect, apart from a regular transmit and receive circuit (data transmission means or main receiver) comprises a very simple wake-up receiver (WUR) which is known for an extremely low energy consumption (e.g. a current consumption of less than 100 µA or less than 10 µA or less than 1 µA) and may thus continuously remain in the receive mode.

In embodiments, this wake-up receiver detects a wake-up signal triggered by events in the network detected by the individual nodes and then activates the radio node which is, for example, in a very power-efficient mode (sleep phase or idle state). This process of waking up may go from node to node, by the node which has been wakened up sending out a wake-up signal in turn after waking up, which is detected by a further radio node. As a consequence, hitherto non-synchronized radio nodes form a synchronous network by resynchronization.

Embodiments also describe a method for a premature activation of a duty cycle-based network which may be synchronous or non-synchronous (e.g. a wireless network) in the sleep phase without synchronization losses. These methods are advantageous as the transmission parameters may be reset and adapted to the data volume. If the individual radio nodes have not been synchronous before, the inventive method allows a reduction of the energy consumption during the synchronization phase.

By the special setup of the wake-up signaling with additional information, thus the energy consumption during synchronization may be clearly minimized. The activation of a previously already synchronous wireless network is possible without a synchronization loss and with possibly changed transmission parameters (like, for example, changed frame length, time slot length, frame setup). The wake-up signal in this case contains, for example, information with respect to transmission parameters, which may, for example, include the frame setup and the time of the next data transmission.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
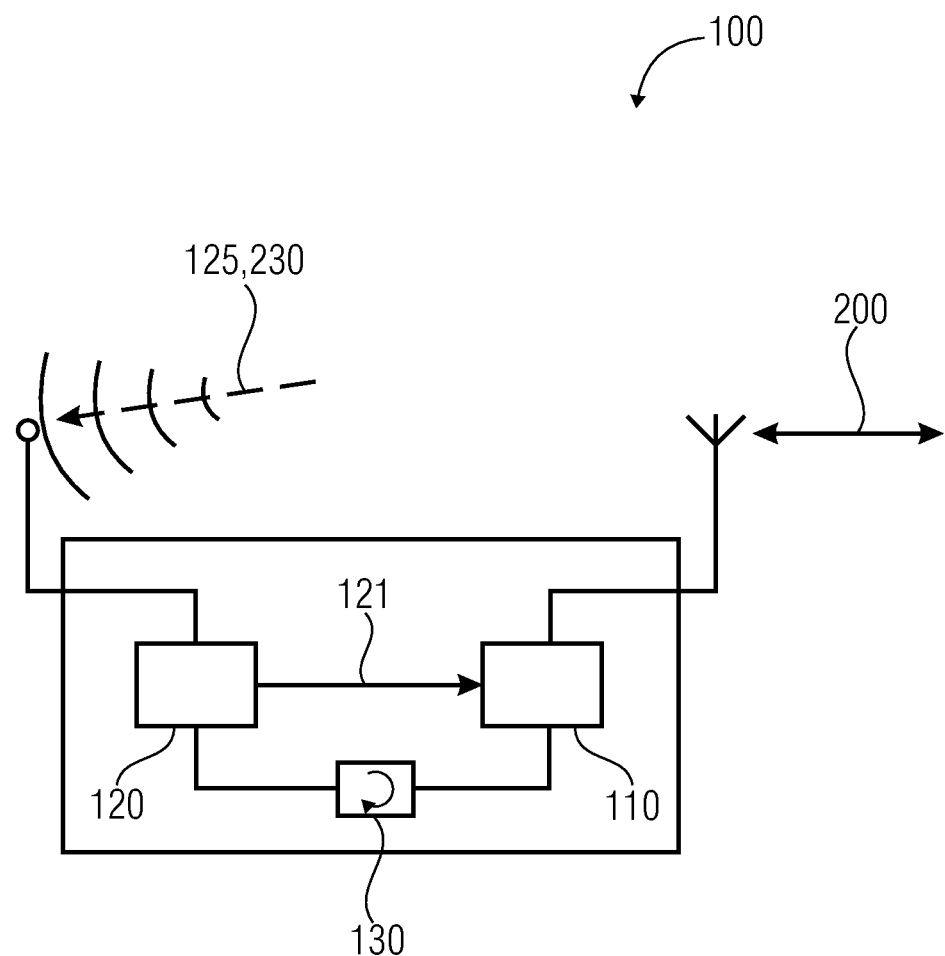
FIG. 1 is a schematical illustration of a data transmission device according to an embodiment of the present invention.

With respect to the following description, it should be noted that, in the different embodiments, same or functionally same functional elements comprise the same reference numerals and thus the description of these functional elements in the different embodiments is mutually interchangeable. Likewise, the selected order may be regarded as an example, so that exchanges of the individual elements are also possible.

FIG. 1 shows an embodiment for a data transmission device 100 comprising a data transmission means 110 and a wake-up receiver 120. The data transmission means 110 may be activated to change from an idle state into an operating state and in the operating state to execute a data transmission 200 with a communication partner. The wake-up receiver 120 is implemented to be ready to receive an initiation signal 125 during the idle state of the data transmission means 110 and to activate the data transmission means 110 in response to the initiation signal 125. This may, for example, take place by transferring an activation signal 121 from the wake-up receiver 120 to the data transmission means 110. The wake-up receiver 120 is further implemented to extract data transmission information 230 from the initiation signal 125 to acquire, depending on the data transmission information 230, the point in time for activating the data transmission means 110 or to activate the data transmission means 110 such that the data transmission means 110 executes the data transmission 200 depending on the data transmission information 230. The data transmission means 110 may, for example, be completely switched off in the idle state 210 (or consume a minimum of energy), so that only the wake-up receiver 120 consumes energy in the idle state. Only in the operating state 220 is the data transmission means 110 for example able to execute the data transmissions 200, while in the idle state 210 it only "listens to" the wake-up receiver 120 or may be switched on by the same.

The data transmission device 100 may further comprise a timer 130 which includes, for example, a clock or a master clock and is, for example, implemented to signalize time ranges to the data transmission means 110 in which a data transmission 200 (for example by means of the TDMA method) is possible in a collision-free manner.

The data transmission information 230 in the simplest case includes the time which may, for example, be determined by means of the timer 130 at which the data transmission means 110 is to be activated. This may, for example, be executed by sending the activation signal 121 to the data transmission means 110 at the time of activation. Apart from that, the data transmission information 230 may include data transmission parameters for the data transmission 200, which include, for example, time slots or frame lengths of the individual data packets within the data transmission 200.

Figure 2:
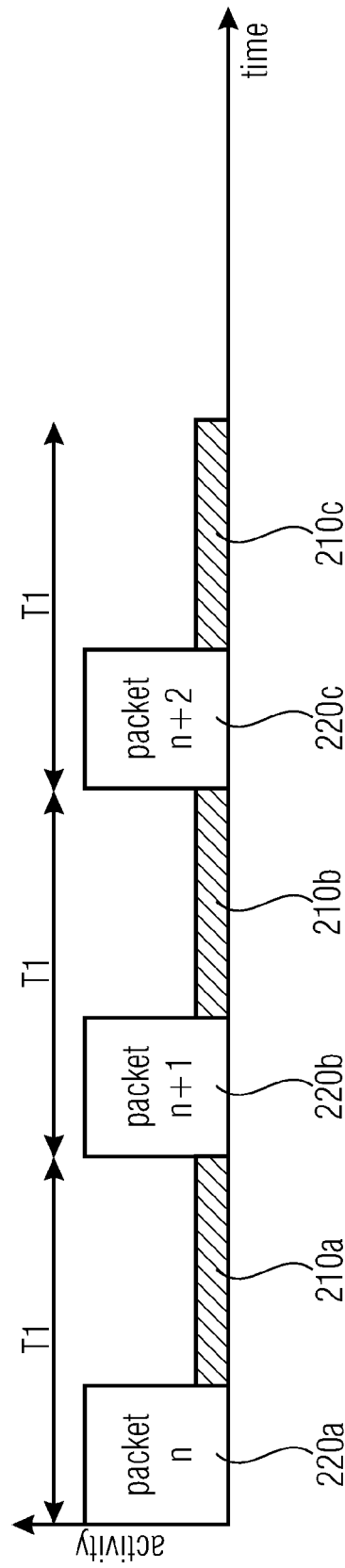
FIG. 2 is a schematical illustration of a normal TDMA operation.

FIG. 2 shows the normal TDMA operation wherein in time slots (frames) individual packets are transmitted, wherein the time sections or time slots 220 are formed such that data of different transmitters (radio nodes) may be transmitted on one channel one after the other and the same do not collide with each other (for example because two transmitters wanted to transfer data simultaneously). In the time slots 220, the radio node is active (operating state) and a data transmission is possible, wherein the respective time period of the data transmission determines the frame length (time slot length). In the remaining time (idle) 210, the radio node is inactive (sleep mode or idle state). Thus, FIG. 2 shows the activity of the data transmission means 110 over time. During a first time slot 220a, the data transmission of the packet n takes place. Subsequently, a first idle phase 210a (idle state) takes place and after a time T1 (measured from the beginning of the transmission of the packet n) a second data packet n+1 is transmitted in the second time slot 220b. After a second idle phase 210b, after a further time range T1, subsequently in a third time slot 220c the transmission of a third packet n+2 takes place. In the idle phases 210a, 210b and 210c, then other transmission nodes may transfer data without the individual nodes interfering with each other. During the idle phases 210, apart from that, for example, the wake-up receiver 120 may remain active, but the data transmission means 110 is inactive during the idle phases 210. Thus, a periodic data transmission results with the time period T1 characterized by the operating state 220 and the idle state 210, wherein the percentage of the operating state 220 of the overall period T1 is referred to as the duty cycle.

This TDMA method thus defines a known output scenario which may alternatively be described as follows. To save energy, a synchronous wireless network operates in the TDMA method with a low duty cycle. Only in the range 220 between certain discrete times (time slots), the transceiver of the radio node is active and data communication is possible. Outside these time slots, the radio node is inactive (sleep mode 210). This applies in particular for its transceiver. In the sleep mode, the additional, extremely current-saving wake-up receiver is activated and remains ready to receive during the complete sleep phase. Radio nodes of previously non-synchronous networks are continuously in a sleep mode and thus the wake-up receiver is permanently active.

Due to the continuous readiness to receive of the wake-up receiver in the sleep mode of the radio node, in the sleep mode wake-up signals may be detected at any time. Wake-up signaling serves primarily to activate the radio node. This means that the reception of a correct wake-up signal puts the radio node into an active state in which the same is able to react to a certain event. Data communication is possible at the earliest in the next time slot.

A radio node is synchronized when, on the one hand, it follows the time behavior of the remaining network and is, on the other hand, integrated into the network (for example logged in, etc.), such that it can or is allowed to also participate in a communication.

Figure 3:
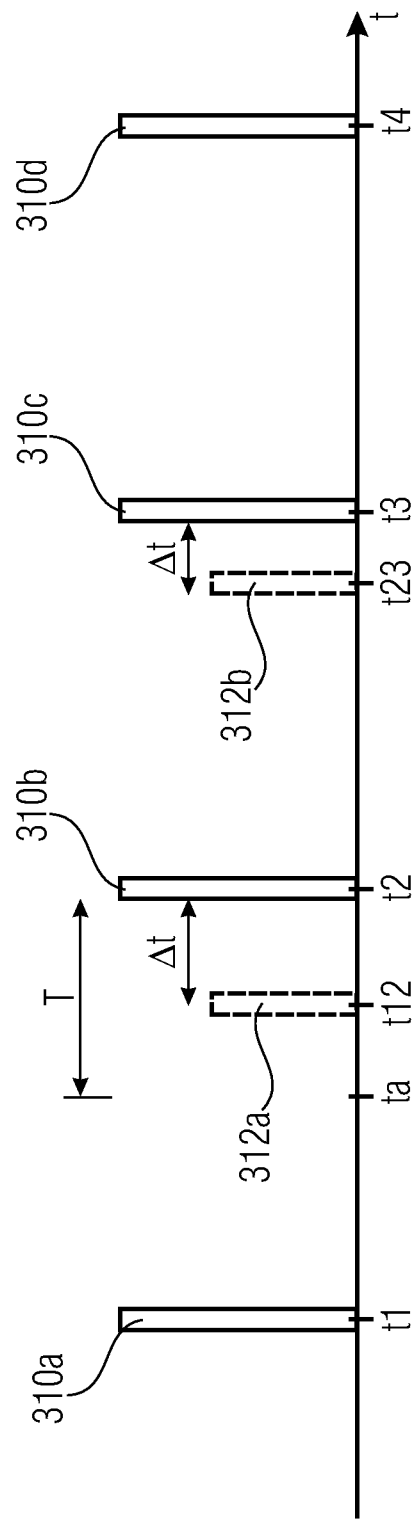
FIG. 3 is an illustration of the drifting apart of the time clocks of different network nodes.

FIG. 3 illustrates a problem of conventional methods. When the duty cycle is especially small and very long idle phases 210 occur, there is the danger of the timers 130 drifting apart. In FIG. 3, along the time t first of all the timer of a central node is illustrated which sends out a first time signal 310a at a time t1, a second time signal 310b at a time t2, a third time signal 310c at a time t3 and a fourth time signal 310c at a time t4, wherein the distance of the individual time signals 310 is, for example, equal, and thus a clock is given, at which the individual network nodes may synchronize (the so-called beacon signal). When the idle phases 210 are very long and the individual network nodes synchronize only at very large distances, this may lead to the timers 130 of the individual transmission nodes 100 having moved away from the beacon signal 310 by a time distance $\Delta t$, so that, for example, a data transmission device 100 comprises a first clock signal 312a at a time t12 and a second clock signal 312b at a time t23. Both clock signals 312 have moved away from the time signal 310b and 310c by the time $\Delta t$ (for example stayed behind). To still guarantee a synchronous data transmission, it is important that the timers 130 of the individual transmission nodes 100 are reset so that they are in accord with the timer 310 of the central node, i.e. they have to synchronize. This may, for example, be done by putting the timers 130 (which may, for example, comprise clocks) forward (or backward) by $\Delta t$.

According to embodiments, this drifting apart plays no role, however. For example, at a time ta an activation by means of the initiation signal 125 takes place, by which the time t2 is reported so that it is known when the next time clock is to be expected. This may, for example, be done by transferring the time period T (T=t2−ta) up to the time t2, so that the time drift $\Delta t$ plays no role. It is thus possible for the data transmission device 100 to wait with activating the data transmission means 110 up to the time t2 and for the same not to be activated beforehand. When, for example, the beacon signals 310 are received by the main receiver 110, thus energy may clearly be saved. The time duration T may here either be transmitted directly to the data transmission means 110 by means of an activation signal 121 which interprets this time difference T such that only after an elapse of the time difference T does the data transmission means 110 activate. Alternatively, the wake-up receiver 120 may be implemented to wait with sending out the activation signal 121 until the time period T has elapsed.

In the following, the detailed processes according to the embodiments will be described in more detail.

Figure 4:
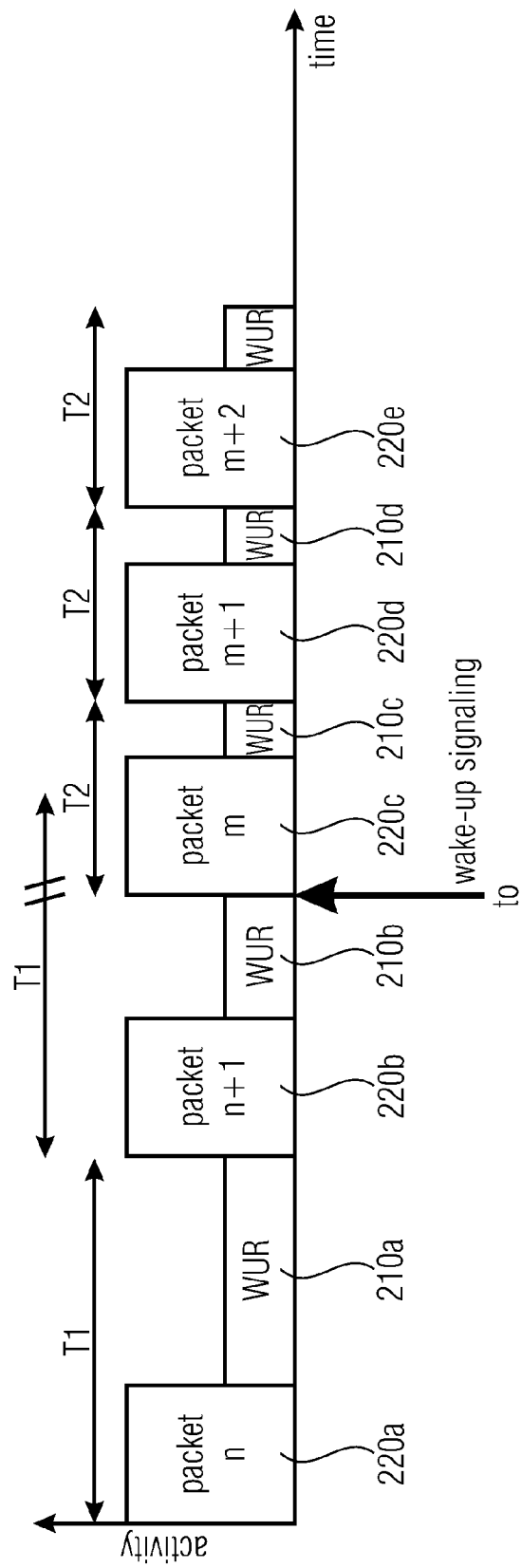
FIG. 4 is an activation of a synchronous network without synchronization losses according to a further embodiment.

FIG. 4 shows an embodiment for activating a synchronous network without synchronization loss. Up to wake-up signaling at the time t0, the network used, for example, the previous TDMA access with the period duration T1, as is, for example, illustrated in FIG. 2. Up to this time t0, the period duration was T1 and with the wake-up signaling at the time t0 a change to the period duration T2 is to be executed which may, for example, be shorter or also longer in order, for example, to acquire a higher data throughput. This means a modification of the transmission parameters and in particular of the duty cycle as, for example, the portion of the operating state 220 with respect to the period duration T2 may be greater or also smaller. In detail, FIG. 4 shows that in a first time slot 220a a packet n is transmitted, in a second time slot 220b, which starts after the period duration T1 after the beginning of the first time slot 220a, a transmission of the packet n+1 takes place. Between the first time slot 220a and the second time slot 220b, a first idle phase 210a exists and a second idle phase 210b follows after the transmission of the packet n+1. The wake-up receiver 120 (WUR) is, for example, only activated within the idle phases 210 (alternatively, the wake-up receiver 120 may also be permanently activated).

The time t0 is in the second idle phase 210b, wherein at this time the wake-up signaling is executed by sending out the initiation signal 125, wherein the initiation signal 125 contains, for example, information as data transmission information 230 that a change from the first period duration T1 to the second period duration T2 has to be made and that at the time t0 the transmission of the packet m may be started (optionally, also a change in the time slot lengths may be executed). Thus, the data transmission means 110, starting from the time t0, transmits the packet m in a third time slot 220c, after which a third idle phase 210c follows, so that the third idle phase 210c and the third time slot or the third operating state 220c together form the second period duration or duration T2. The time slots 220 may, for example, be selected to be shorter or longer after the change of the period duration from T1 to T2. Likewise, the idle phases 210 may change. After the second period duration T2, in a fourth time slot 220d, the transmission of the packet m+1 takes place, and in a fifth time slot 220e the transmission of the packet m+2 takes place. Between the fourth and fifth time slots 220d, 220e a fourth idle phase 210d is formed.

The activation of a synchronous network, as was the case up to the time t0, may thus take place without synchronization losses.

Thus, the wake-up signal (initiation signal 125) is detected by the wake-up receiver 120 at the time t0 or sooner (the radio node is in the sleep mode). The wake-up signal 125 contains additional information 230 about when the next communication is possible in the network 200, for example, and how the transmission parameters for this transmission have to be selected.

The wake-up receiver 120 activates the network node 100. The same activates its main receiver 110 exactly at the beginning of the time t0 reported in the wake-up signal (next time slot). Thus, the radio node 100 may participate in the next communication in the network without newly synchronizing beforehand. As the node has already been synchronous before, it may immediately participate in the communication in the next time slot 220c.

Figure 5:
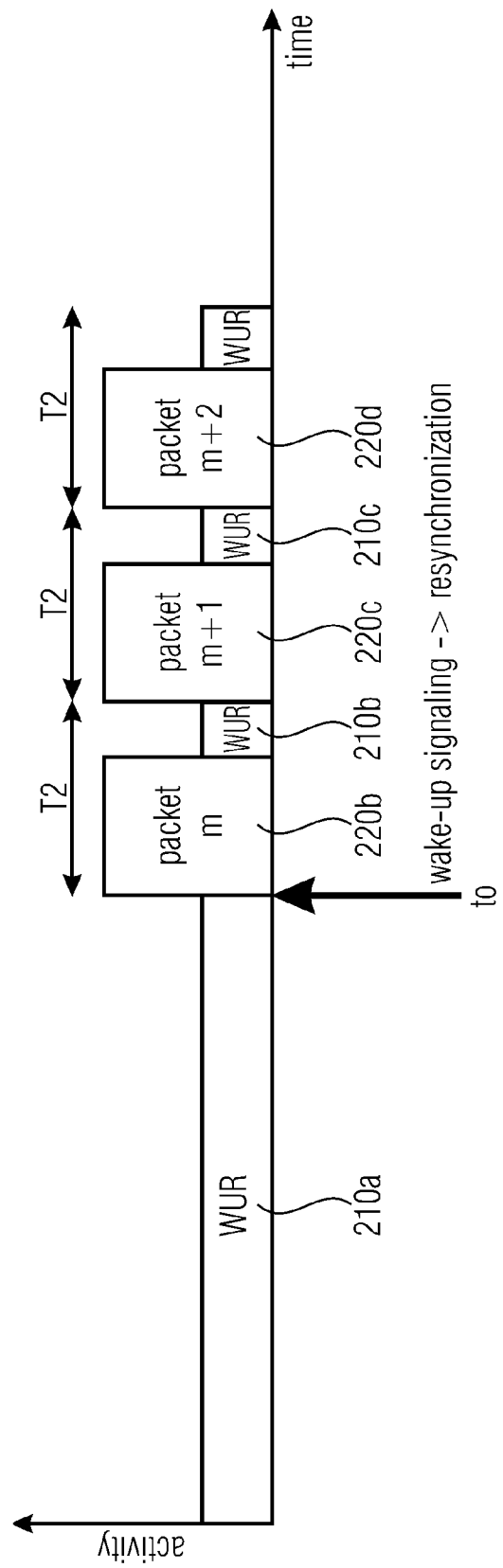
FIG. 5 is an activation of a previously non-synchronous network according to a further embodiment.

FIG. 5 shows an embodiment of an activation of a previously non-synchronous network, wherein during the first idle phase 210a in which the wake-up receiver 120 is active, the time t0 of the next time slot 220a is reported. The transmission parameters (for example again the second period duration T2) may, as before, also be reported by means of the initiation signal 125 (data transmission information as additional information 230).

Thus, the wake-up signal 125 is detected by the wake-up receiver 120 (the radio node 100 is in the sleep mode 210a).

If the wake-up signal 125 contains no further additional information, the wake-up receiver only activates the network node 100 and causes it to do a new synchronization. I.e., the main receiver 110 is activated permanently or in the TDMA method to detect a synchronization signal (e.g. beacon). In the following, the radio node 100 will synchronize to the clock of the network 310 (see FIG. 3) and the network 200 is set up.

If the wake-up signal 125 contains additional information 230 on the beginning of the next time slot (e.g. t0), the radio node 100 activates its receiver specifically at this time to receive the synchronization signal.

The signaling may, for example, contain additional information 230 regarding which transmission parameters (e.g. period T2) are to be selected from the next time slot 220a. The wake-up receiver 120 causes the radio node 100 to set to these.

Figure 6:
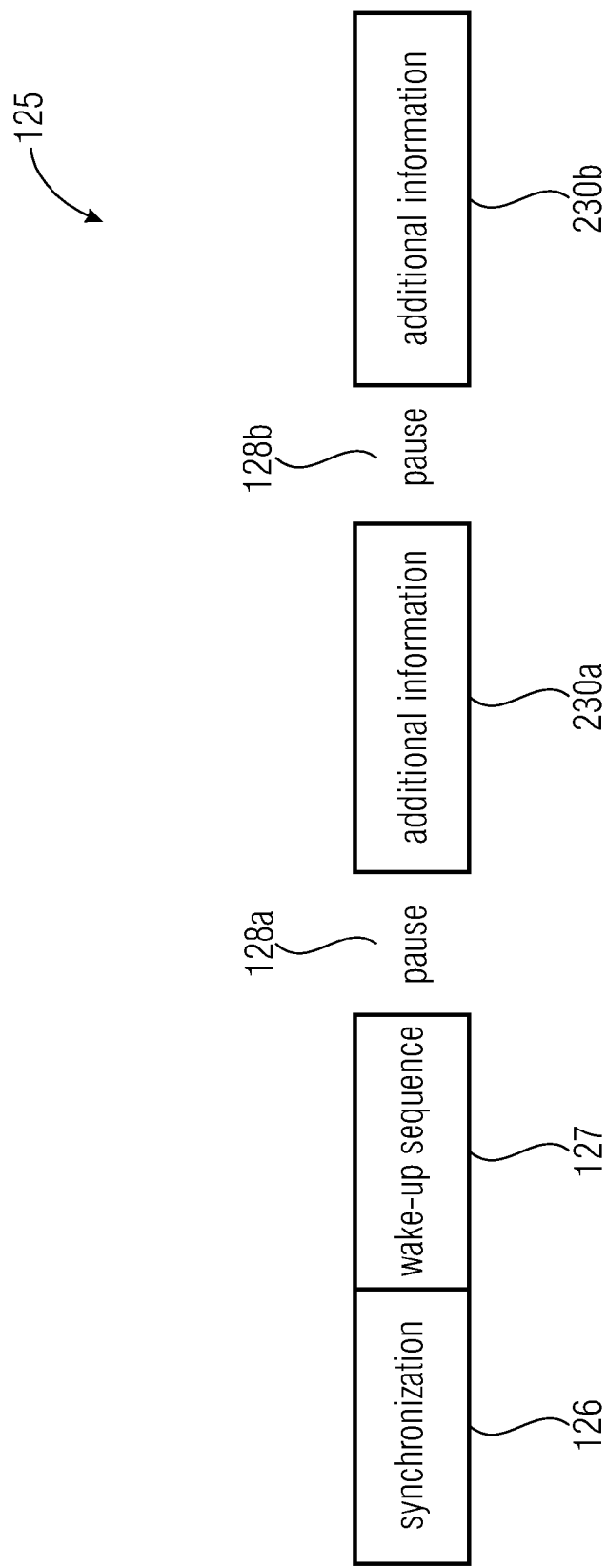
FIG. 6 is a possible setup for the wake-up signaling according to embodiments.

FIG. 6 schematically shows a possible setup of the initiation signal 125. For example, the initiation signal 125 may first of all comprise a synchronization or a synchronization signal 126 followed by a wake-up sequence 127. After an optional first pause 128a, the initiation signal 125 comprises first additional information 230a and after a second, further optional pause 128b, the initiation signal 125 comprises second additional information 230b. This sequence may continue until all desired additional information 230 has been transmitted by the initiation signal 125. The synchronization 126 may, for example, comprise a time stamp and/or a network identification signal, the wake-up sequence 127 may, for example, comprise a certain data sequence which identifies the signal as a wake-up sequence for a certain network and/or a network node. After these first two sections of the initiation signal 125 have been detected, the network node knows that it is a wake-up signal and waits for additional information 230 which may, for example, be contained after a pause 128 in the initiation signal.

Figure 7:
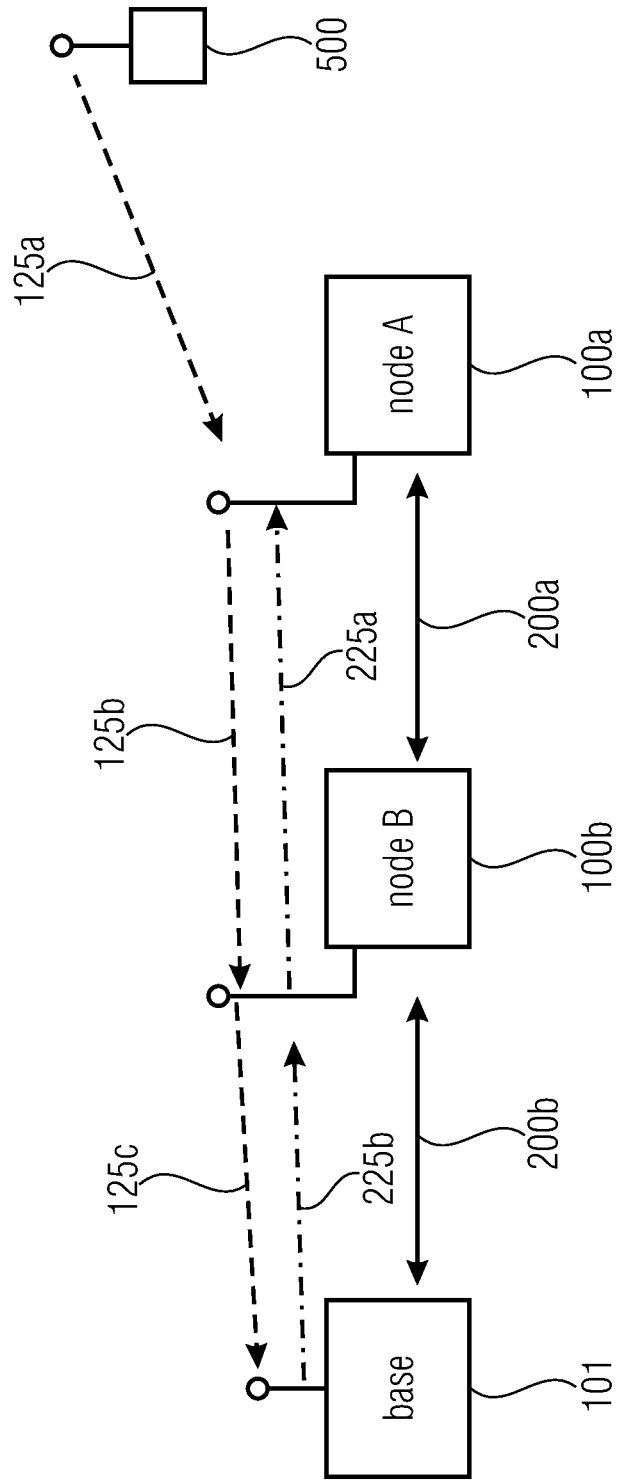
FIG. 7 is an activation of several network nodes which activate and synchronize themselves one after the other according to embodiments.

FIG. 7, finally, shows an embodiment wherein several network nodes are activated one after the other. The activation may, for example, be initiated by means of a sensor 500 or a sensor node. For example, the sensor 500 may detect a sensor signal (e.g. from a light barrier, a motion detector, a thermometer or other sensors), based on which the sensor 500 sends the first initiation signal 125a. The first initiation signal 125a is received by the first node 100a and, in response to receiving the first initiation signal 125a, the first node 100a sends a second initiation signal 125b which is received by a second node 100b which, in turn, sends out a third initiation signal 125c. This sequence of steps may be continued. A master node 101 (base or base node) receives, for example, the third initiation signal 125c and subsequently serves as a control node for synchronizing the network. For example, the master node 101 determines the data transmission parameters and/or transmits the beacon signal 310 for synchronization. The synchronization may, for example, be done by the master node 101 sending back a further initiation signal 225b which is, for example, received by the second node 100b, and by the second node 100b being implemented to extract the data transmission information 230 from the further initiation signal 225 and apply the same for the second node 100b. At the same time, the second node 100b sends a second, further initiation signal 225a which is received by the first node 100a which, in turn, extracts data transmission information 230a from the second further initiation signal 225a. Using the further initiation signals 225, for example the network parameters are then transmitted so that all nodes know, for example, the times of the data transmission (each node may, for example, have suitable time slots associated to it). The data transmission 200a between the first node 100a and the second node 100b may be set up by the data transmission means 110a of the first network node 100a and the data transmission means 100b of the second network node 100b. Alternatively, the data transmission 200 is not directly set up between the individual network nodes, but may be set up based on the higher transmission power also directly to the basis, to other network nodes or to a further receiver.

Thus, in FIG. 7 an embodiment is illustrated in which, for example, the master node 101 is located very far from the sensor node 500. so that the initiation signal or sensor signal 125 from the sensor 500 does not directly reach the master node 101, but so that the sensor signal is to be transmitted successively from a network node 100 to the next network node. Simultaneously, together with the initiation signal 125, a wish may be expressed, for example to set up a broadband connection as broad as possible or set up a broadband connection to a specific receiver. This information is, for example, passed on to the master node 101 which then takes over control regarding the setup of the desired connection. The master node 101 may then, on the one hand, send out the clock signals (beacon signals 310) and, on the other hand, inform the individual network nodes 100 at what time the synchronization signals are to be expected. This takes place with the further initiation signals 225 which, starting from the master node 101, are again transmitted successively through the complete network. Thus, the individual initiation signals 125 and 225 are different due to the fact that the first initiation signals 125 first of all signalize the sensor event and may, apart from that, comprise additional information, like, for example, the needed bandwidth (e.g. to switch a camera online to subsequently transmit the video signal to a receiver). On the other hand, the further initiation signals 225 comprise node-specific data and/or information which inform the network nodes when the synchronization signals (beacon signals 310) are to be expected.

As the wake-up receivers 120 only need to comprise a range up to a next node, the wake-up receivers may be implemented to be very small and energy-saving. For example, the energy consumption of the wake-up receivers 120 may be smaller by a factor of 10 or 100 or 1000 than the energy consumption of the data transmission means 110 (e.g. a current consumption of less than 100 μA). This simultaneously means that, for example, also the range of the wake-up receivers only has to be between 10 and 200 meters or alternatively between 20 and 60 meters or be approx. 30 meters. On the other hand, the data transmission means 110 may, for example, be implemented to provide a transmission power so that a plurality of network nodes are able to receive the data of a transmitting network node or at least so that the master node 101 is able to receive the transmitted data.

In further embodiments, also the master node 101 is in an idle phase and waits for the first activation signal 125 which, for example, signalizes a sensor event. The master node 101 only has to send out the clock signals 310 for synchronizing at the time of receiving the first initiation signal 125, so that during the idle phase or the idle state 210 no synchronization signals are transmitted. By transmitting the second initiation signals 225, in this embodiment the information may be reported when the synchronization signals are to be expected—or when the master node 101 sends out the synchronization clock signals. The individual nodes then take over the frame length, as they are, for example, given by the synchronization signals. In the conventional TDMA method, the frame length is, for example, several minutes, in which a transmission time for a given node is available only for a few milliseconds. I.e., in case of an alarm in conventional methods, a transmission may only take place after several minutes.

In further embodiments, only the data transmission means 110 comprises a transmission unit and the wake-up receiver 120 is only implemented to receive the wake-up signal.

The embodiments of the present invention illustrated in FIGS. 2 to 7 which describe the detailed processes more exactly may also be summarized as follows.

The described method uses a special wake-up signaling. The wake-up signal may contain different additional information 230 which allow the radio nodes 100 to be influenced regarding their function.

The wake-up signaling may, for example, contain additional information 230 about when the next time slot (e.g. beacon) is to be expected and, e.g., a data transmission in the network is possible. The clock generator in the network may, accordingly, e.g. when a certain event occurs, bring forward the time of the next time slot and report this by a wake-up signal 125 (see FIG. 4). In addition to this, the transmission parameters may be newly selected for the following data communication by the additional information 230 contained in the wake-up signaling.

As the radio node 100 knows, when receiving the wake-up signal 125, when the next time slot starts and how the transmission parameters are to be selected, it may at any time use the next time slot for communication, even if the same no longer follows the present TDMA access scheme.

If the radio node 100 is already synchronous, it may adapt to the new time performance and the transmission parameters without losing its synchronicity to the network. A previously non-synchronous radio node 100 does not have to activate the main receiver 110 after receiving the wake-up signal 125 to receive a synchronization message at any later time. From the wake-up signal 125 it may gather the right time and specifically activate the receiver at the beginning of the time slot 220. The energy consumption during synchronization is thus reduced.

Although a data transmission is further only possible in the next time slot, passing on an event may be very quick, as the time of the next time slot may be freely selected and may possibly follow shortly after the wake-up signal 125. The latency for passing on the event is then very low.

By the possible use of other transmission parameters, a reaction to an event may not only be very quick (the network may be activated with a short latency), but in particular in systems with very long sleep times the transmission parameters may be set dynamically depending on the planned data volume after each wake-up signaling. Thus, a network with a very low duty cycle may, for example operate until a certain event occurs. If this is the case, the network may be activated with a low latency and a data transmission of a limited duration may be executed, e.g. with a high duty cycle.

In a further embodiment it is also possible not to transmit the frame length or the time period of the next synchronization signal directly, but instead to transmit only the time in which no transmission takes place. A further network node may conclude from this that the time period in which no transmission takes place is available for transmission and, in turn, blocks a part of this free slot. Subsequently, the network node still transmits the remaining time period in which no transmission takes place so that the next network node selects, in turn, its own slot for data transmission within this free slot.

One basic advantage of the present invention is that the frame length may be made very long, so that the individual network nodes 100 are almost exclusively in the idle state 210. Alternatively, it is even possible that the individual network nodes are completely asynchronous and switched off or are in the idle state 210 and only synchronize with each other when activated. Despite the long idle phases, it is thus possible in embodiments that an alarm is quickly passed on, as the transmission of the initiation signals 125 and the further initiation signals 225 takes place very fast. In contrast to that, in conventional methods a waiting time at any time had to be waited for until a data transmission was available for the next time slot. The additional information 230 which, according to embodiments, is transmitted together with the initiation signal 125 (or the second initiation signal 225) may, for example, also include an IP address or the frame format.

Advantages of the embodiments may also be summarized as follows. The inventive method, in connection with a suitable wake-up receiver 120, enables receiving and evaluating wake-up signals 125 at any time. With conventional systems with TDMA methods, a reception is only possible at discrete points in time (time slots 220) in order to reduce energy consumption.

Thus, synchronous networks with a low duty cycle (long sleep times, low current consumption) and low energy consumption may be realized which perform a low-frequency task (like, for example, data transmission once an hour), but may be activated by a corresponding event at any time and also outside their active times (e.g. alarm event). Despite usually long latencies, important events may be passed on quickly. Due to setting possibilities of transmission parameters, additionally a dynamic adaptation to tasks to be expected is possible (e.g. data volume).

As a waking-up node 100 is already informed when the next synchronization message is to be expected or the next transmission is possible and what transmission parameters are to be used here, from this time the node 100 is synchronized to the remaining network. This also applies when it has not been synchronous to the remaining network beforehand. Thus, from this time on (time slot) data may actively be passed on. A previously synchronous network does not lose its synchronicity. A previously non-synchronous network acquires synchronicity with a low energy consumption.

The current consumption when setting up previously non-synchronous networks is thus lower, as the time of the next synchronization message is reported in the wake-up signal and a long "listening" until receiving the next synchronization message may be omitted.

Embodiments further include a method for activating a data transmission, the method including receiving an initiation signal 125 by the wake-up receiver 120 during the idle state 210 of the data transmission means 100, extracting the data transmission information 230 from the initiation signal 125 and activating the data transmission means 110 in response to the initiation signal 125 to change from the idle state 210 into an operating state 220 to execute a data transmission 200 with a communication partner in the operating state 220. The data transmission information 230 comprises the time for activating the data transmission means 110 or the data transmission means 110 is activated such that the data transmission 200 may be executed depending on the data transmission information 230.

The above embodiments were related to a data transmission system of data transmission devices, one of which was characterized as a special node, i.e. the master node. This master node was responsible in these systems for providing the synchronization time base. Data transmission devices apart from the master node had a wake-up receiver 120 having a transmitter for sending out a sequence initiation signal by the transmitter in response to receiving an incoming initiation signal, wherein both initiation signals comprised information which reported when the synchronization signals, which were then to be received by the respective associated data transmission means, were to be expected. The synchronization signals were sent out by the master node 101 intermittently or even periodically. As already mentioned above, the point in time in these initiation signals, i.e. the time in which, for example, the first of the synchronization signals is to be expected, may be given in the form of a time span or a time period which passes until sending out the first synchronization signal. The incoming initiation signal and the sequence initiation signal may possibly deviate in order to take into consideration the time period which passes from receiving the incoming initiation signal until sending out the sequence initiation signal. In the case of FIG. 7, node B was a node which had this corresponding characteristic, but of course in the system of FIG. 7 many such nodes exist.

Figure 8:
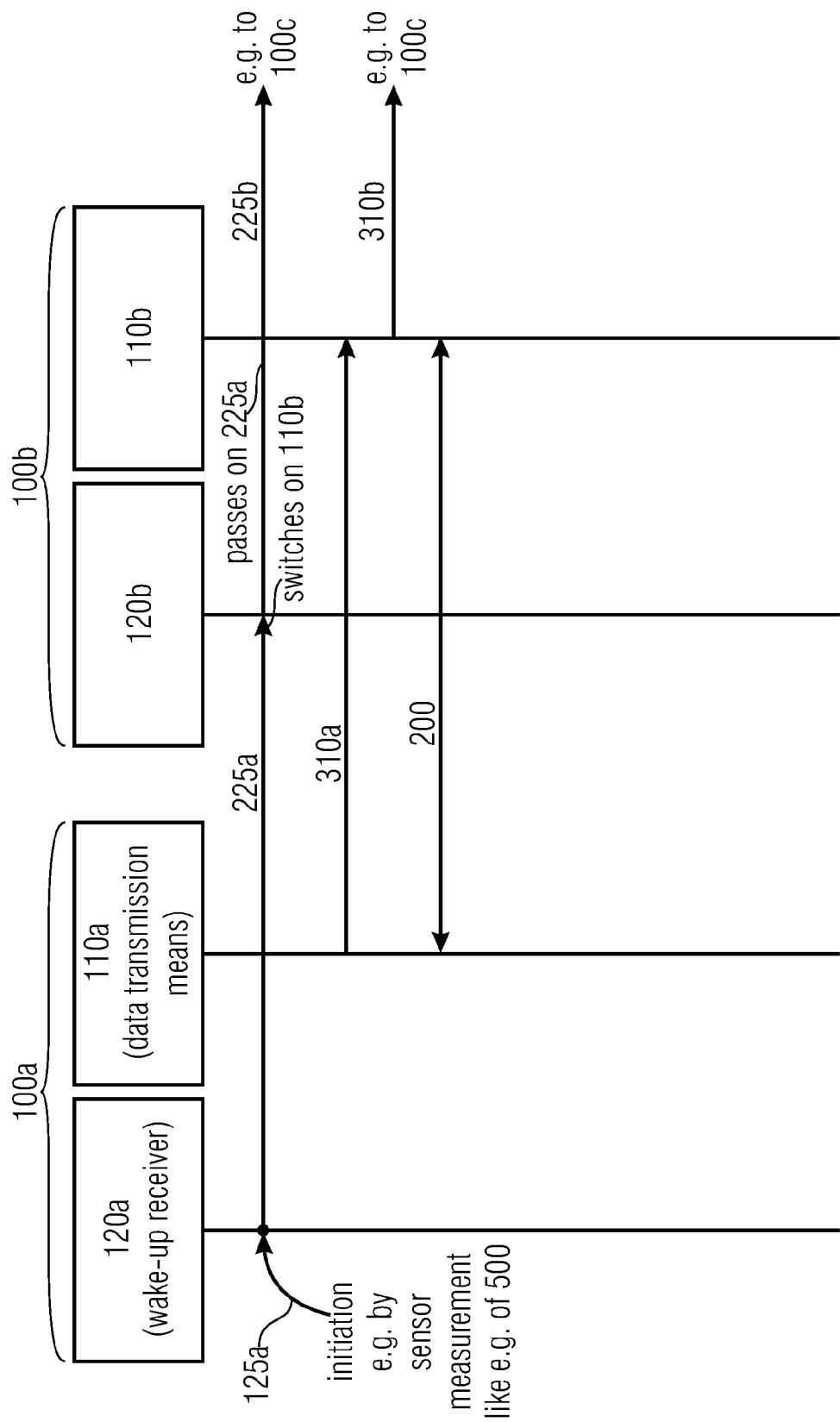
FIG. 8 is an alternative system of network nodes with respect to the system of FIG. 7.

FIG. 8 now shows a system alternative to the system of FIG. 7. It differs from the system of FIG. 7 in that basically any node 100a, 100b may function as the master node. In FIG. 8, as an example only two nodes 100a and 100b are illustrated, but the system according to FIG. 8 may, just like the system according to FIG. 7, of course include more than only two nodes. And any of these nodes 100a and 100b may take over the role of the master node of FIG. 7. Which one it is only depends on which one contains a first initiation signal 125a, for example due to a sensor measurement. The system of FIG. 8 thus, for example, includes a plurality of data transmission devices 100a-100c or nodes as well as a plurality, for example, of sensors 500, as were illustrated in FIG. 7. Each sensor 500 continuously detects a sensor signal and, based on the same, transmits an initiation signal 125a, for example when a certain sensor event is detected in the sensor signal, like, e.g., detecting the formation of smoke, the exceeding of a temperature threshold or the like. Then the sensor 500 outputs the initiation signal 125a which, for example, reaches the next node 100a. The same now takes over the task of the master node. Node 100a previously did not need to have been the master node. For example, a different node may have been the master node, like, e.g., the node 100b. Apart from that, the time period since the last data communication across the respective data transmission means 110 of the data transmission devices 100a-100c may have been a long time ago, so that synchronization no longer exists anyway. This is not a problem, however, as the synchronization is only now set up simply by node 100a, as was described above with reference to FIG. 7 based on the basis 101. I.e., the wake-up receiver 120a transmits a corresponding initiation signal 225a to the node 100b, which receives this initiation signal 225a with its wake-up receiver 120b. It contains information about when the data transmission means 110a of the node 100a will send out the synchronization signal 310a, i.e. for example the first synchronization signal of a periodic sequence of synchronization signals sent out in the approaching communication of the nodes 100a. The node 100b receives the initiation signal 225a by the wake-up receiver 120b and does two things, i.e. the wake-up receiver 120b passes on the initiation signal 225a in the form of the initiation signal 225b by sending out the latter, like, e.g., to the node 100c of the system, which is, however, not illustrated in FIG. 8, and apart from that switches on the data transmission means 110b of the node 100b, i.e. in time before the scheduled reception of the synchronization signal 310a. This then follows at the given time. I.e., the data transmission means 110a of the node 100a sends out the synchronization signal 310a at the scheduled time, whereupon the same is received by the data transmission means 110b of the node 100b which was woken up in time. The node 100b passes on the synchronization signal 310a, i.e. in the form of the synchronization signal 310b. The nodes 100a and 100b are then already synchronized and a communication 200 may take place between the same.

As was described above, the indication of the time period in the copy 225b may deviate from the one in 225a, in order to balance the feed-forward time offset. It is further possible for the wake-up receiver to pass on the copy 225b only when the time period given in the signal falls below a certain threshold which did not allow the node 100c to activate its main receiver 100c in time for receiving the synchronization signal 310. If the time period is not sufficient, the signal 225a is passed on in a modified way, i.e. such that the passed-on signal indicates the time duration until the synchronization signal after next.

At this point it is still to be noted that it was previously frequently described that the wake-up receivers also include a transmission portion or transmitter which may then also send out a corresponding initiation signal. In an actual implementation it may be the case that the wake-up receiver and the data transmission means of a respective node overlap to a large extent, like, e.g., with respect to a large part of the hardware. The wake-up receiver and data transmission means for example only differ gradually, like, e.g., with respect to the low receive amplification and transmission amplification of the wake-up receiver, the higher portion of error protection redundancy on the side of the wake-up receiver and/or the smaller modulation alphabet on the side of the wake-up receiver. It is, for example, possible that sending out the initiation signals comprises the same line consumption as sending out the synchronization signals. However, a lower power consumption is also possible. At any rate, the wake-up receiver may, however, receive the initiation signals with less power consumption than the main receiver receives the synchronization signals. The data rate may, however, be substantially lower on the side of the initiation signals. Accordingly, it is also possible that the degree of the above-mentioned overlap is greater on the transmission side than on the receive side. On the receive side, the overlap may, for example, be restricted to the antenna, and even the same may be provided separately for the wake-up and the main receiver.

As it became clear from FIG. 8 and the associated description, it is not necessarily compulsory that a node from the nodes of a system is set apart from the others as a master node. If, for example, in the case of FIG. 8 the node 100b had been induced by a respective sensor 500 by a corresponding initiation signal 125a to output, in turn, a corresponding initiation signal 225a to the nodes 100a and 100c, then this node 100b would thereupon have output the synchronization signal 310a to the nodes 100a and 100c at the time given in the initiation signal (or shortly afterwards). The nodes 100a and 100c would have been woken up at the given point in time by their respective wake-up receivers and the same would have synchronized to the node 100b based on the synchronization signal from the node 100b. As may be seen, the sensor network of FIG. 8 is thus able to sleep at any time. A setup of a data transmission is possible based on a sensor event of each of a plurality of sensors. Where the sensor event occurs in the plurality of sensor nodes 500 possibly arranged in a very distributed manner is not important according to the embodiment of FIG. 8.

Thus, embodiments describe a method which, for example, provides radio-supported signaling by a wake-up sequence which may be received and detected in a current-saving radio receiver. The wake-up sequence is followed by additional information 230 which indicates the time of switching on the main receiver for the regular, fully functional wireless sensor network operation. By this, a new synchronization of the network nodes is omitted. Simultaneously, transmission parameters for the radio network protocol may be transmitted.

Although some aspects were described in connection with a device, it is obvious that those aspects also represent a description of the corresponding method, so that a block or a member of a device may also be regarded as a corresponding method step or as a feature of a method step. Analog to that, aspects described in connection with or as a method step also represent a description of a corresponding block or detail or feature of a corresponding device.

Depending on certain implementation requirements, embodiments of the invention may be implemented in hardware or in software. The implementation may be executed using a digital storage medium, for example a floppy disc, a DVD, a Blu-ray disc, a CD, an ROM, a PROM, an EPROM, an EEPROM or a FLASH memory, a main disc or another magnetic or optical memory on which the electronically readable control signals are stored which may cooperate or cooperate with a programmable computer system such that the respective method is executed. Thus, the digital storage medium may be computer-readable. Some embodiments according to the invention thus include a data carrier comprising electronically readable control signals which are able to cooperate with a programmable computer system such that one of the methods described herein is executed.

In general, embodiments of the present invention may be implemented as a computer program product having a program code, wherein the program code is effective in order to execute one of the methods when the computer program product runs on a computer. The program code may, for example also be stored on a non-transitory computer machine-readable medium.

Other embodiments include the computer program for executing one of the methods described herein, wherein the computer program is stored on a non-transitory computer machine-readable medium.

In other words, an embodiment of the inventive method thus is a computer program comprising a program code for executing one of the methods described herein, when the computer program is executed on a computer. A further embodiment of the inventive method is thus a data carrier (or a digital storage medium or a computer-readable medium) on which the computer program for executing one of the methods described herein is recorded.

A further embodiment of the inventive method thus is a data stream or a sequence of signals representing the computer program for executing one of the methods described herein. The data stream or the sequence of signals may, for example, be configured such that it can be transferred via a data communication connection, for example via the internet.

A further embodiment includes a processing means, for example a computer or a programmable logics device configured or adapted in order to execute one of the methods described herein.

A further embodiments includes a computer on which the computer program for executing one of the methods described herein is installed.

In some embodiments, a programmable logics device (for example a field-programmable gate array, an FPGA) may be used to execute some or all of the functionalities of the methods described herein. In some embodiments, a field-programmable gate array may cooperate with a microprocessor to execute one of the methods described herein. In general, in some embodiments the methods are executed by any hardware device. The same may be a universally usable hardware like a computer processor (CPU) or hardware which is specific for the method, for example an ASIC.

The above-described embodiments merely represent an illustration of the principles of the present invention. It is obvious that modifications and variations of the arrangements and details described herein are obvious for other persons skilled in the art. It is thus the object for the invention to be limited only by the scope of the following patent claims and not by the specific details which were presented using the description and the specification of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data transmission device, comprising:
   a data transmitter which may be activated to change from an idle state into an operating state and to execute a data transmission with a communication partner in the operating state, and
   a wake-up receiver which is implemented to be ready to receive for an initiation signal during the idle state of the data transmitter and to activate the data transmitter in response to the initiation signal,
   wherein the wake-up receiver is implemented to extract data transmission information from the initiation signal to determine a time for activating the data transmitter depending on the data transmission information or to activate the data transmitter such that the data transmitter executes the data transmission depending on the data transmission information; wherein the wake-up receiver further comprises an energy consumption which is smaller by a factor of at least 10 than an energy consumption of the data transmitter in the operating state;
   wherein the initiation signal is a first initiation signal and wherein the data transmission device is implemented to send out a second initiation signal in response to receiving the first initiation signal, wherein the first and the second initiation signals comprise information which report when synchronization signals are to be expected which are to be received by the data transmitter; and
   wherein the data transmission device is implemented so that the information which comprise the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal.

2. The data transmission device according to claim 1, wherein the wake-up receiver is implemented to transmit an activation signal to the data transmitter and wherein the data transmitter is implemented to change from the idle state into the operating state in response to the activation signal.

3. The data transmission device according to claim 2, wherein the wake-up receiver is implemented to transmit the activation signal with a time delay after receiving the initiation signal to the data transmitter.

4. The data transmission device according to claim 1, wherein the wake-up receiver is further implemented to receive an initiation signal signaling a sensor event and comprising a needed bandwidth and wherein the data transmission device is further implemented to send out a second initiation signal signalizing the sensor event by the sensor upon receiving the initiation signal signalizing the reception of the sensor event.

5. The data transmission device according to claim 1, wherein the data transmission information comprises a length of a time slot or a period duration of two subsequent time slots.

6. The data transmitter according to claim 1, which is implemented to exchange data with further data transmission devices using a TDMA method with a period duration and a time slot length, the wake-up receiver being implemented to extract a changed period duration and/or a changed time slot length from the data transmission information and the data transmitter being implemented to execute the data transmission using the changed period duration and/or the changed time slot length.

7. The data transmission device according to claim 1, wherein the time for the activation of the data transmitter is a synchronization time at which a synchronization signal may be received.

8. The data transmission device according to claim 1, wherein the data transmission information comprises a plurality of additional information separated from each other by a pause.

9. A data transmission system, said system comprising:
   a plurality of data transmission devices which comprise:
   a data transmitter which may be activated to change from an idle state into an operating state and to execute a data transmission with a communication partner in the operating state, and
   a wake-up receiver which is implemented to be ready to receive for an initiation signal during the idle state of the data transmitter and to activate the data transmitter in response to the initiation signal,
   wherein the wake-up receiver is implemented to extract data transmission information from the initiation signal to determine a time for activating the data transmitter depending on the data transmission information or to activate the data transmitter such that the data transmitter executes the data transmission depending on the data transmission information;
   wherein the wake-up receiver further comprises an energy consumption which is smaller by a factor of at least 10 than an energy consumption of the data transmitter in the operating state;
   wherein the initiation signal is a first initiation signal and wherein the data transmission device is implemented to send out a second initiation signal in response to receiving the first initiation signal, wherein the first and the second initiation signals comprise information which report when synchronization signals are to be expected which are to be received by the data transmitter; and
   wherein the data transmission device is implemented so that the information which comprise the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal; and a master node which is implemented to control the activation of the data transmission.

10. The data transmission system according to claim 9, wherein the master node is implemented to send out a periodic synchronization signal and to send out a further initiation signal, wherein the further initiation signal comprises information on the time of sending out the synchronization signal.

11. The data transmission system according to claim 9, further comprising a sensor node for detecting a sensor signal, wherein the sensor node is implemented to transmit the initiation signal in response to the sensor signal and thus activate the data transmission devices.

12. A data transmission system, said system comprising:
a plurality of data transmission devices, each of them comprising: a data transmitter which may be activated to change from an idle state into an operating state and to execute a data transmission with a communication partner in the operating state, and
a wake-up receiver which is implemented to be ready to receive for a first initiation signal during the idle state of the data transmitter and to activate the data transmitter in response to the first initiation signal,
wherein the wake-up receiver is implemented to extract data transmission information from the first initiation signal to determine a time for activating the data transmitter depending on the data transmission information or to activate the data transmitter such that the data transmitter executes the data transmission depending on the data transmission information;
wherein the wake-up receiver further comprises an energy consumption which is smaller by a factor of at least 10 than an energy consumption of the data transmitter in the operating state;
wherein the initiation signal is a first initiation signal and wherein the respective data transmission device is implemented to send out a second initiation signal in response to receiving the first initiation signal, wherein the first and second initiation signals comprise information which report when synchronization signals are to be expected which are to be received by the data transmitter;
wherein the respective data transmission device is additionally implemented so that the information which comprise the first and second initiation signals and report, when synchronization signals are to be expected, are given in the form of a time span which passes until sending out the synchronization signals, and that the first and second initiation signals deviate in so far as the time duration is considered which passes from receiving the first initiation signal until sending out the second initiation signal; and
a plurality of sensors for detecting a sensor signal and sending out a second initiation signal based on the same, wherein the wake-up receiver of each data transmission device is further implemented to be ready to receive also for the second initiation signal during the idle state of the data transmitter and to activate the data transmitter in response to the second initiation signal such that the data transmitter sends out synchronization signals, wherein each data transmission device is additionally implemented to send out a first initiation signal upon receiving the second initiation signal.

13. The data transmission system according to claim 12, wherein each data transmission device is implemented such that the sent-out first initiation signal reports when the synchronization signals are to be expected which are sent out by the data transmitter of the data transmission device of the respective wake-up receiver upon the second initiation signal.

14. A method for activating a data transmission, said method comprising:

receiving an initiation signal by a wake-up receiver during the idle state of a data transmitter; wherein the wake-up receiver further comprises an energy consumption which is smaller by a factor of at least 10 than an energy consumption of the data transmitter in the operating state;
extracting data transmission information from the initiation signal; and
activating a data transmitter in response to the initiation signal to change from the idle state into an operating state, to execute a data transmission with a communication partner in the operating state,
wherein the data transmission information comprises a time for activating the data transmitter or the data transmitter is activated such that the data transmission may be executed depending on the data transmission information;
wherein the initiation signal is a first initiation signal and wherein, in response to receiving the first initiation signal, a second initiation signal is sent out, wherein the first and second initiation signals comprise information which reports when synchronization signals are to be expected which are to be received by the data transmitter; and
wherein the information which comprises the first and second initiation signal and reports when synchronization signals are to be expected are given in the form of a time span which passes until sending out the synchronization signals, and the first and second initiation signals deviate in so far as the time duration is considered which passes from receiving the first initiation signal until sending out the second initiation signal.

15. The method according to claim 14, wherein the time of activating lies after a time duration after receiving the initiation signal and the activation is not executed until the time of activating.

16. A non-transitory computer readable medium embodied with a computer program, wherein the computer program comprising program codes which when executed by a processor perform method for activating a data transmission steps of:
receiving an initiation signal by a wake-up receiver during the idle state of a data transmitter; wherein the wake-up receiver further comprises an energy consumption which is smaller by a factor of at least 10 than an energy consumption of the data transmitter in the operating state;
extracting data transmission information from the initiation signal; and
activating a data transmitter in response to the initiation signal to change from the idle state into an operating state, to execute a data transmission with a communication partner in the operating state,
wherein the data transmission information comprises a time for activating the data transmitter or the data transmitter is activated such that the data transmission may be executed depending on the data transmission information;
wherein the initiation signal is a first initiation signal and wherein, in response to receiving the first initiation signal, a second initiation signal is sent out, wherein the first and second initiation signals comprise information which reports when synchronization signals are to be expected which are to be received by the data transmitter;
wherein the information which comprises the first and second initiation signal and reports when synchronization signals are to be expected are given in the form of a time span which passes until sending out the synchronization signals, and the first and second initiation signals deviate in so far as the time duration is considered which passes from receiving the first initiation signal until sending out the second initiation signal; and wherein the time of activating lies after a time duration after receiving the initiation signal and the activation is not executed until the time of activating.

* * * * *